United States Patent [19]
Marantette

[11] Patent Number: 5,387,969
[45] Date of Patent: Feb. 7, 1995

[54] MACHINE TOOL POSITION MEASUREMENT EMPLOYING MULTIPLE LASER DISTANCE MEASUREMENTS

[75] Inventor: William F. Marantette, Torrance, Calif.

[73] Assignee: Optima Industries, Inc., Torrance, Calif.

[21] Appl. No.: 80,912

[22] Filed: Jun. 22, 1993

[51] Int. Cl.⁶ .............................................. G01B 9/02
[52] U.S. Cl. ..................... 356/4.5; 356/358; 409/179; 414/749
[58] Field of Search ............. 356/4.5, 358, 363; 414/749, 750; 50/165.72; 409/178, 179

[56] References Cited

U.S. PATENT DOCUMENTS 4,417,843  11/1983  Bonga ................................ 414/749
4,714,339  12/1987  Lau et al. .......................... 356/4.5

Primary Examiner—Samuel A. Turner
Attorney, Agent, or Firm—Poms, Smith, Lande & Rose

[57] ABSTRACT

Positions of the spindles (116-124) of a multi-axis drilling machine (130,132,140,142) are precisely measured by three scanning laser beams (165,167,169). The scanning laser beams are swept in oscillating sweeps across areas of motion of each of three corner reflectors (160,162,164) that are fixedly mounted to an unguided spindle carrying structural beam (132) that is driven by three screw actuators (150,152,154). Each scanning laser beam is projected from a fixed reference position and tracks one of the corner reflectors. Each beam locks onto its associated corner reflector, and, while locked on, an interferometer (180,190,198) measures incremental changes of the distance between each scanning mirror (166,168,170) and its corner reflector. Three measured distances (C1, C2, C3) between the respective corner reflectors and three reference positions from which the three laser beams are projected enable calculation of the position of the moving corner reflectors, and, therefore, the related drilling spindles relative to a reference system.

37 Claims, 8 Drawing Sheets

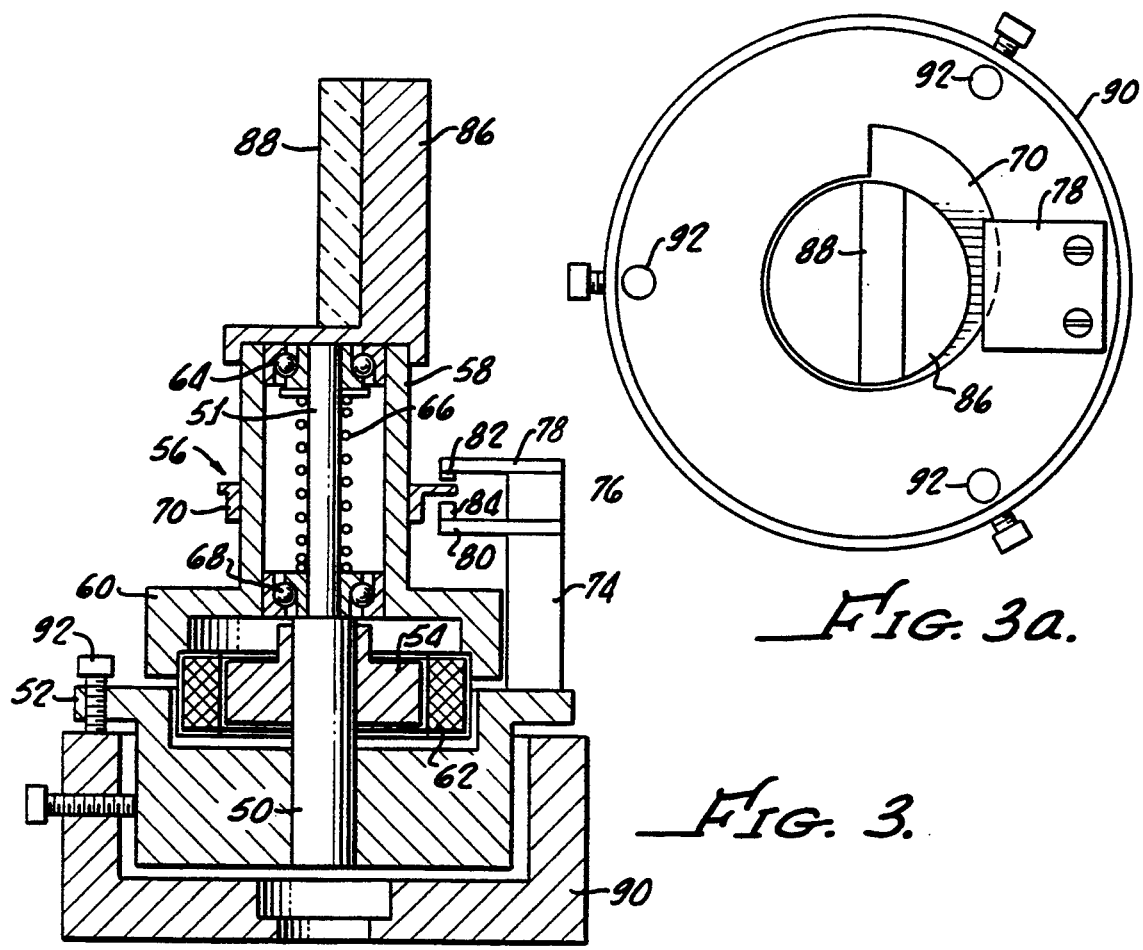
FIG. 3.
FIG. 3a.
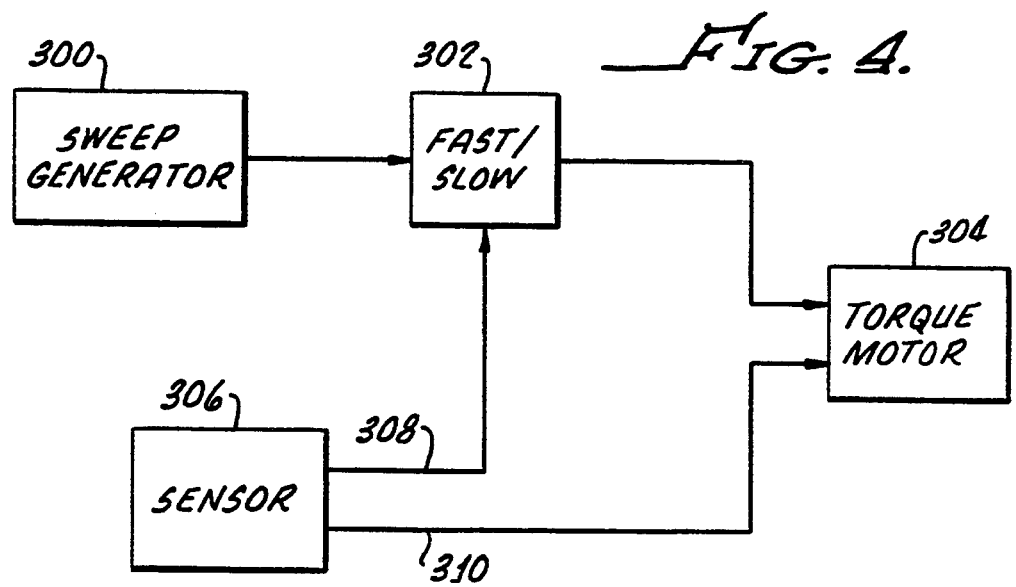
FIG. 4.

MACHINE TOOL POSITION MEASUREMENT EMPLOYING MULTIPLE LASER DISTANCE MEASUREMENTS

BACKGROUND OF THE INVENTION

The present invention relates to position measuring systems, and more particularly concerns laser position measurement of a moving machine tool member.

In a wide variety of machine tool systems a tool is moved to a preselected location at which it is to perform an operation such as drilling, routing, and placement of parts, among others. For such operations it is essential to know the location of the tool so that the hole can be drilled in a particular position or a part can be placed at desired location, etc. Preferably, for precision positioning of a tool, a closed loop system is employed in which actual position of the tool is measured and compared with a commanded position to derive an error or difference signal used to drive the tool. Many different types of position measuring systems have been employed but all suffer from lack of sufficient accuracy for precise positioning systems or excessive cost.

Among the most precise measuring systems are those employing a laser for making interference measurements. These systems include a laser generating unit, an interferometer and a receiver. A typical system also includes a separate corner reflector and may have a display unit for displaying measurement numbers. However, such laser measuring systems for machine tool operations are severely limited by the fact that the laser interferometer can measure only a distance or change of distance in a fixed direction between the laser beam and the reflector. Because tool positioning must be carried out while the tool is in motion, the typical laser interferometer measuring system cannot be employed for directly measuring position of a moving tool. As the tool moves, its corner reflector moves with it, but where the laser beam is fixed and has no arrangement to keep the beam directed to the moving corner reflector on the moving tool, laser measurement cannot be used.

In most machine tool positioning systems the tool support structure or carriage is constrained by guideways generally aligned in mutually orthogonal X and Y orientations so that the carriage and tool may move to any given X,Y position within an X,Y plane by a combination of motions along the axes. Lengths of the X axis motion and Y axis motion are measured to identify the resulting tool position. However, accuracy of such systems is severely limited by difficulties in manufacturing precision guideways. As accuracy requirements are increased, cost of the manufacture of the precision guideways increases rapidly. Such guideways are required to be perfectly straight, without small bends, and must be precisely aligned in the selected direction. Manufacture is a costly procedure, and therefore precision systems employing guided ways are very expensive. Such guideways do lend themselves to accurate distance measurement in a fixed direction, since a laser may be employed to measure the distance traveled along X and Y axes. However, laser measurement is not available for measurement of systems that do not travel in predetermined directions on precision guideways, since the laser system can only measure distance in a predetermined direction, and laser machine tool sensors have no tracking or target finding ability.

Accordingly, it is an object of the present invention to provide a position measuring system that avoids or eliminates above mentioned problems.

SUMMARY OF THE INVENTION

In carrying out principles of the present invention, in accordance with a preferred embodiment thereof, a retro-reflector is mounted on a movable tool support member that is driven to a plurality of positions within a predetermined work area. An energy beam is projected from a fixed position in a scanning sweep through the work area as the member is driven, and is employed to measure the distance between the moving retro-reflector and the reference position.

According to a feature of the invention, the scanning sweep of the energy beam is stopped when the beam impinges upon the retro-reflector, and reflection received from the retro-reflector is employed to measure the change in distance after the beam has been locked on to the retro-reflector.

According to another feature of the invention, a rapid scanning sweep of the beam is slowed when the beam first impinges upon the corner reflector, and after the beam sweep is stopped energy reflected from the corner reflector is used to provide a fine position signal that precisely directs the beam to the corner reflector.

BRIEF DESCRIPTION OF THE DRAWINGS

FIG. 3 is a sectional elevation of a scanning mirror assembly structure.

FIG. 3a illustrates shape of a sweep controlling cam.

FIG. 4 is a functional diagram of a beam sweep control circuit.

DESCRIPTION OF THE PREFERRED EMBODIMENTS SCANNING AND MEASURING LASER SYSTEM

In general, a position measuring system embodying principles of the present invention employs a scanning laser beam that sweeps in a plane through an area that includes all positions of a corner reflector that moves with a tool that moves in a plane. Thus, no matter what position within a predetermined work area is occupied by the moving corner reflector, the sweeping laser beam will intersect the corner reflector at some point in the beam sweep. At that time the beam sweep is significantly slowed and then stopped to lock the laser beam directly upon the optical center of the corner reflector so that an interferometer may measure distance between the axis of the sweeping beam and the optical center of the corner reflector. In an expository system three corner reflectors are fixedly mounted on a tool support member, and three sweeping laser beams are employed, each individual to one of the corner reflectors, so that a distance between each of three fixed reference points and an associated one of three corner reflectors is measured. The three measured distances thus effectively define the X,Y position of the member carrying the corner reflectors in an X,Y reference plane.

Figure 1:
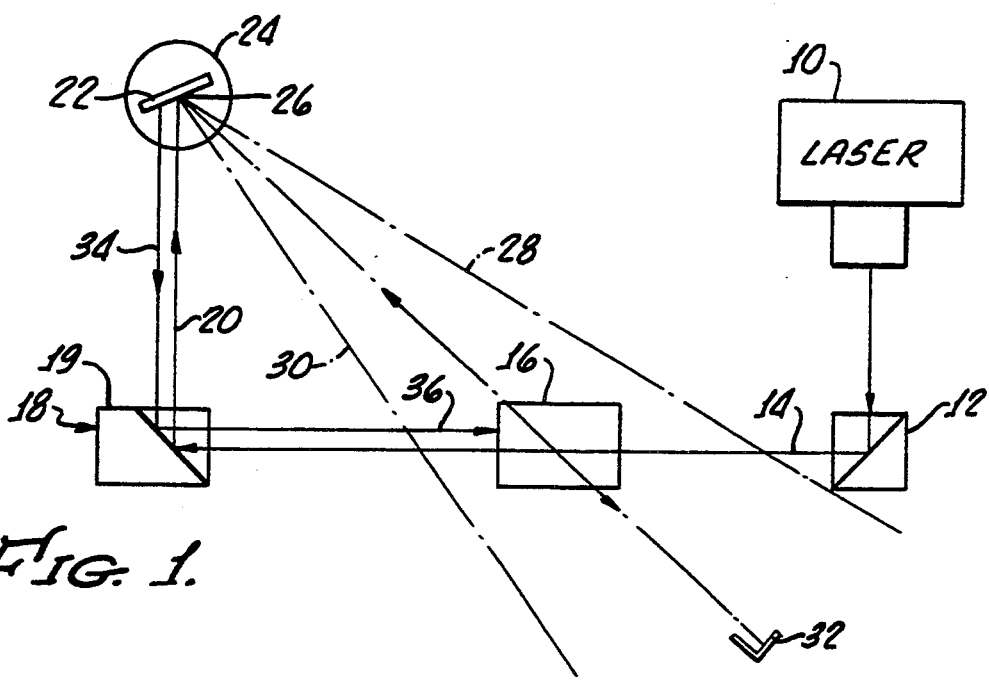
FIG. 1 is a conceptual illustration of a laser beam scanning and measuring system embodying principles of the present invention.

Illustrated in FIG. 1 is a plan view of components of a single sweeping beam measurement. A laser 10 sends a laser beam to a reflective mirror 12, which turns the beam and directs it along an optical path 14 that passes slightly above an interferometer receiver 16 to an interferometer 18, which splits the beam in two (intensity, not size) and directs it along an optical path leg 20 to a reflective mirror 22. Mirror 22 is mounted on a support structure 24 that oscillates the mirror about a vertical axis 26 to cause the laser beam, when reflected by the oscillating mirror, to sweep back and forth through an angular sweep area between dotted lines 28,30. A corner reflector 32 is mounted on a tool support member (not shown in FIG. 1) which moves through a predetermined work area in the course of the normal movements of the tool support member as it positions a tool carried thereby. The total area in a horizontal plane through which the corner reflector and tool support member may possibly move in ordinary operations is limited and known. Therefore the magnitude of the laser beam sweep and its location can readily be selected to ensure that the beam will impinge upon the corner reflector 32 at some point in the beam sweep regardless of what position is occupied by the corner reflector during normal operation of the tool. The corner reflector receives the incoming beam and retro-reflects it along a path precisely parallel to the incoming light beam path, but lowered by a small distance, such as approximately one-half inch.

When the beam initially impinges upon the corner reflector, the relatively fast oscillating sweep is significantly slowed, until fine position circuitry, to be described below, takes control of the rotatable position of mirror 22 to lock the beam precisely on the optical center of the corner reflector. Although the scanning sweep stops, the corner reflector may continue to move, and the beam is locked on to the moving corner reflector by a fine position control. Distance is measured during control of the beam by the fine position control. With scanning of the mirror stopped and the mirror beam locked onto the corner reflector, the light reflected from the corner reflector is received by the mirror 22, which reflects it back to the interferometer 18. The other half of the beam along path 14, which was split off, continues through the interferometer where it encounters a retro-reflector and then returns through the interferometer and along path 36 to receiver 16. The interferometer thus produces an output in the form of a series of light and dark pulses on the lowered optical path leg 36.

The pulsing beam from the interferometer is fed along the lower optical path leg 36 to the receiver 16, which provides an electrical output in the form of a series of pulses each representing an incremental change of distance between the center of rotation 26 of oscillating mirror 22 and the optical center of the corner reflector, which of course is fixedly mounted to the tool support member and thus to the tool. Each pulse of the receiver represents about twelve millionths of an inch.

The laser system includes conventional commercially available components such as a 5517B laser, a 10780C receiver, a 10702 interferometer, a 10567A beam splitter, a 10707A beam bender, and a 1000-0326 corner reflector, all made by Hewlett Packard Co. and designed to collectively operate as a distance measuring system.

Figure 2:
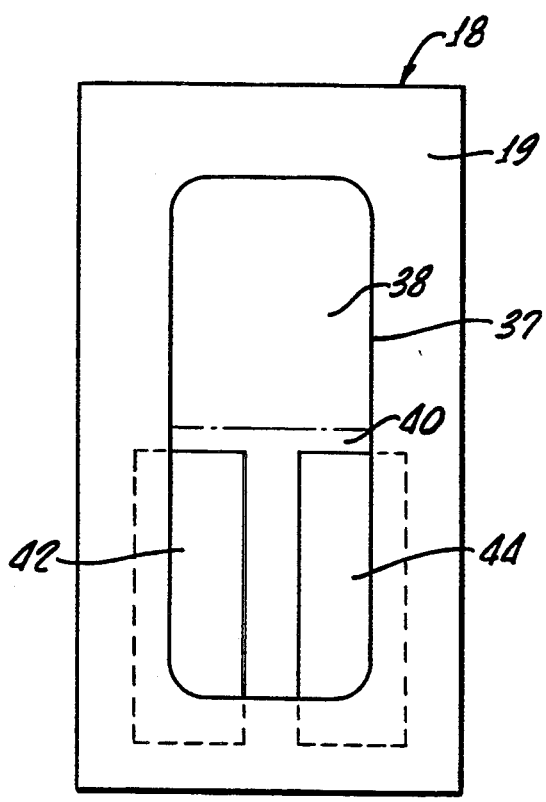
FIG. 2 illustrates aspects of the fine position control for laser beam centering.

The interferometer 18 is modified to include an enlarged light receiving opening on the interferometer face 19 that faces toward the mirror 22. The interferometer face 19, as shown in FIG. 2, includes an opening 37 having an upper portion 38 for transmitting and receiving light to and from mirror 22 for the interference distance measurement. Light from the mirror 22 coming into a lower portion 40 of opening 37 is used for fine positioning by a pair of photocells 42,44 that receive the retro-reflected light from mirror 22. The pair of closely spaced photo cells or photosensitive devices 42,44 are symmetrically mounted to the interferometer at face 19 to partly overlap lower portion 40 of opening 37. Each photo cell generates an electrical signal having a magnitude proportional to the amount of light received thereby. The photocells 42,44 are positioned as shown in FIG. 2 so that their sensitive areas overlap only a portion of opposite sides, respectively, of the opening portion 40. When the incoming light beam is precisely centered on opening 37, the two cells receive equal amounts of light.

As will be more particularly explained below, the two photocells 42,44 effectively control the sweep and fine positioning of the mirror 22. In general, control circuitry causes the mirror 22 to sweep rapidly in a search mode when both cells are dark (receiving no light), to sweep in the search mode at a lower rate of oscillation when one of the cells is light and the other dark, and to stop sweeping when both cells receive light. When both cells receive light sweep control is no longer used. The electrical signals generated by the two cells are compared and the difference employed to provide fine angular positioning of the mirror 22 to a point where equal light is received by the two cells, at which time the beam is precisely directed at the optical center of the corner reflector. During fine angular positioning the corner reflector continues to move, but the beam remains locked on to the corner reflector and distance is measured. The fine positioning continues to hold the beam on the corner reflector throughout all further motion, and repeated distance measurements are made at relatively short intervals.

Effectively, the laser beam sweeps until it captures the moving corner reflector, then locks onto the corner reflector when captured, and measures any distance change to the corner reflector while locked on.

OSCILLATING MIRROR MOUNT

Illustrated in FIG. 3 is a vertical section of an exemplary mounting and sweeping assembly for driving mirror 22 in the described oscillating sweep. A fixed shaft 50 is mounted to a fixed base 52 by means of a press fit or suitable adhesive. A torque motor stator 54 is adhesively bonded to the shaft. A rotor housing 56 includes an upstanding elongated cylindrical sleeve 58 and a radially enlarged rotor housing base 60 carrying a rotor 62. Upper ball bearings 64, a compression coil spring 66 and lower ball bearings 68 are inserted into sleeve 58 of the rotor housing, and the outer race of each of the bearings is fixed to the rotor housing by adhesive bonding. The shaft 50 has an upper section 51 which is a spring loaded fit into the inner race of the lower bearing 68. The top of shaft section 51 is slightly oversized and vertically slotted to allow the inner race of upper bearing 64 to be forced over the upper end of shaft section 51 so that radial pressure may be applied against the inner bearing race to eliminate any clearance between the shaft and the race. By this forcing of the upper bearing over the shaft the spring 66 may be slightly compressed to provide axial pressure to preload the two ball bearings. The inner race of the lower ball bearing is adhesively bonded to the shaft.

A light modulating cam 70 circumscribes the rotor housing 58 and is fixedly mounted to the rotor by suitable means, such as set screws (not shown). An upstanding circuit board support 74 is fixed to base 52 and carries a mounting bracket 76, which in turn fixedly mounts upper and lower circuit boards 78,80. Circuit board 78 carries a light sensitive transistor or photo cell 82 at an inner end, and circuit board 80 carries a light emitting diode or LED 84 on an inner end thereof directly opposite the photo cell 82, with a portion of cam 70 interposed between the photo cell and the LED. Fixed to the upper end of rotor assembly 56 is a mirror holding bracket 86 carrying a scanning mirror 88.

The base and other components attached thereto are mounted in a fixed aluminum mounting cup 90 by suitable means, including a plurality of screws 92 that provide for height and tilt adjustments as may be necessary for proper operation.

FIG. 3a is a plan view illustrating the shape of cam 70 and its relation to the circuit boards carrying the light sensitive photo cell 82 and light emitting diode 84. The cam is shaped in a spiral so as to partly block light from the LED and provide a varying current from the cell 82 as the rotor rotation carries the cam in its rotary oscillation back and forth between the LED and the light sensitive cell. In an exemplary embodiment, the radius of the cam smoothly varies by 0.2 inches over an arc of 180°.

When power is applied to the laser measurement system a beam generated from the laser unit is reflected from the mirror 88, and the torque motor 54,62 starts sweeping back and forth within a 20° arc (±10° from its initial position), causing the mirror to reflect the laser beam through a 40° arc (±20°). In the course of its oscillating sweep the beam will strike the corner reflector and be reflected back so as to stop the sweep, as will be more particularly described below.

Figure 7:
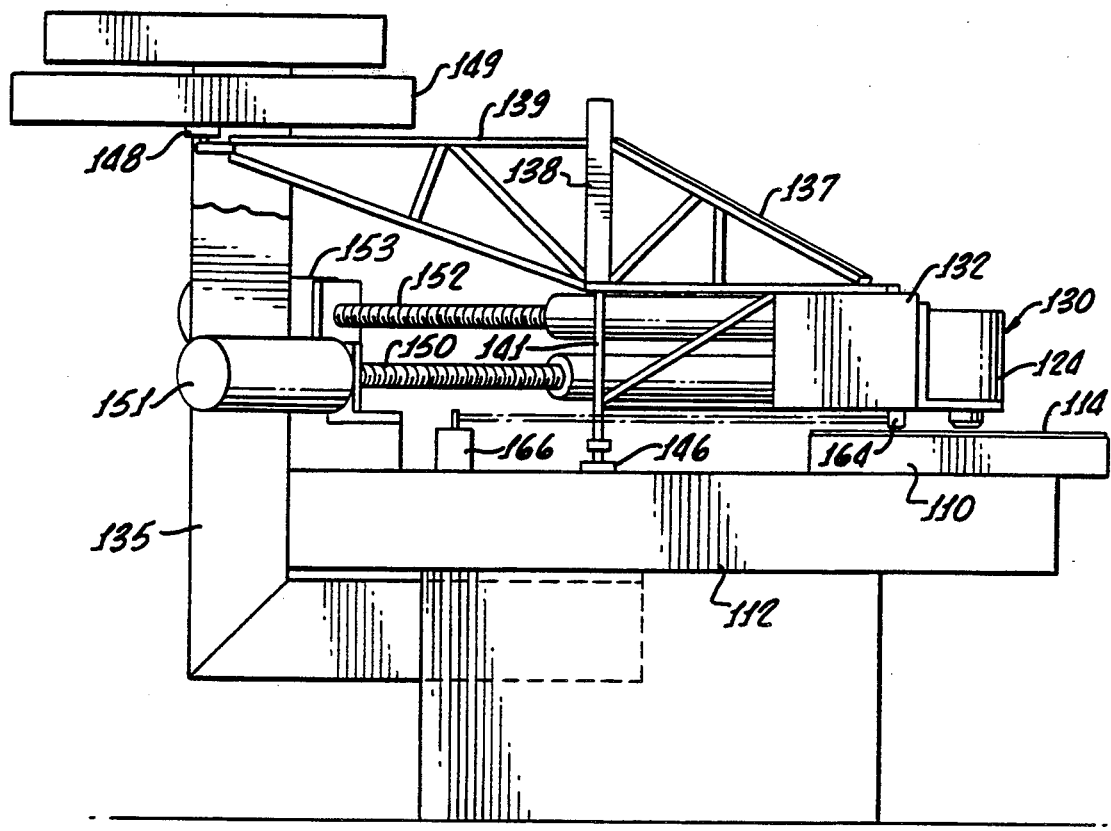
FIG. 7 is an end elevational view of an exemplary structure employing a position measuring system embodying principles of the present invention.
Figure 8:
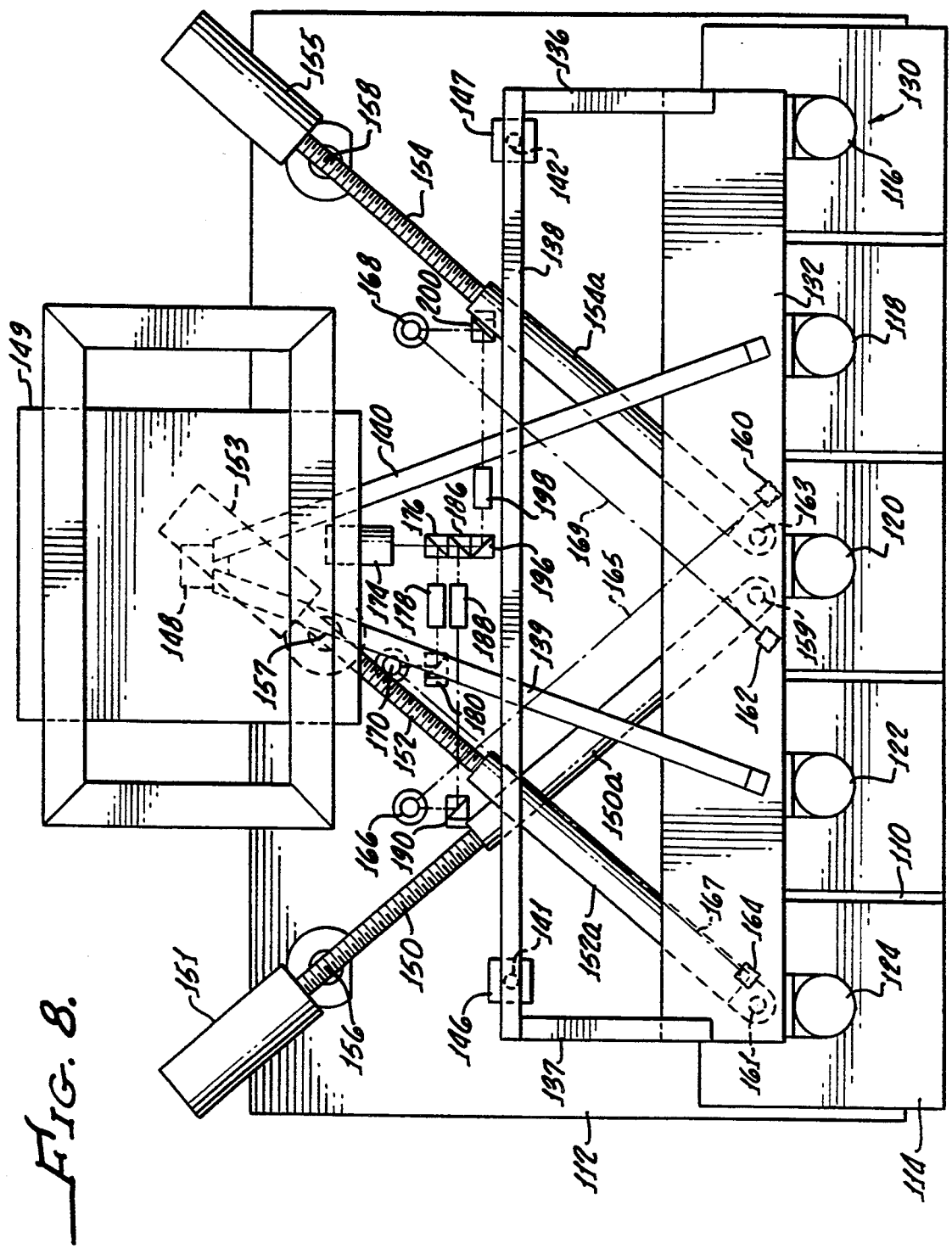
FIG. 8 is a plan view of the structure of FIG. 7.

On initial set up, the laser unit, the reflective mirror and the movable corner reflector are all aligned and oriented close to angles that will allow the system to operate properly. Relative locations of parts in an exemplary multi-bit drilling system are illustrated in FIGS. 7 and 8 below. The corner reflector, as is well known, is a cube containing three mirrors set at 90° to each other. As the beam is received by one of the mirrors it is reflected to a second mirror and then to the third, which sends the beam back along a path which is precisely parallel to the incoming path but lowered as previously described.

Figure 5:
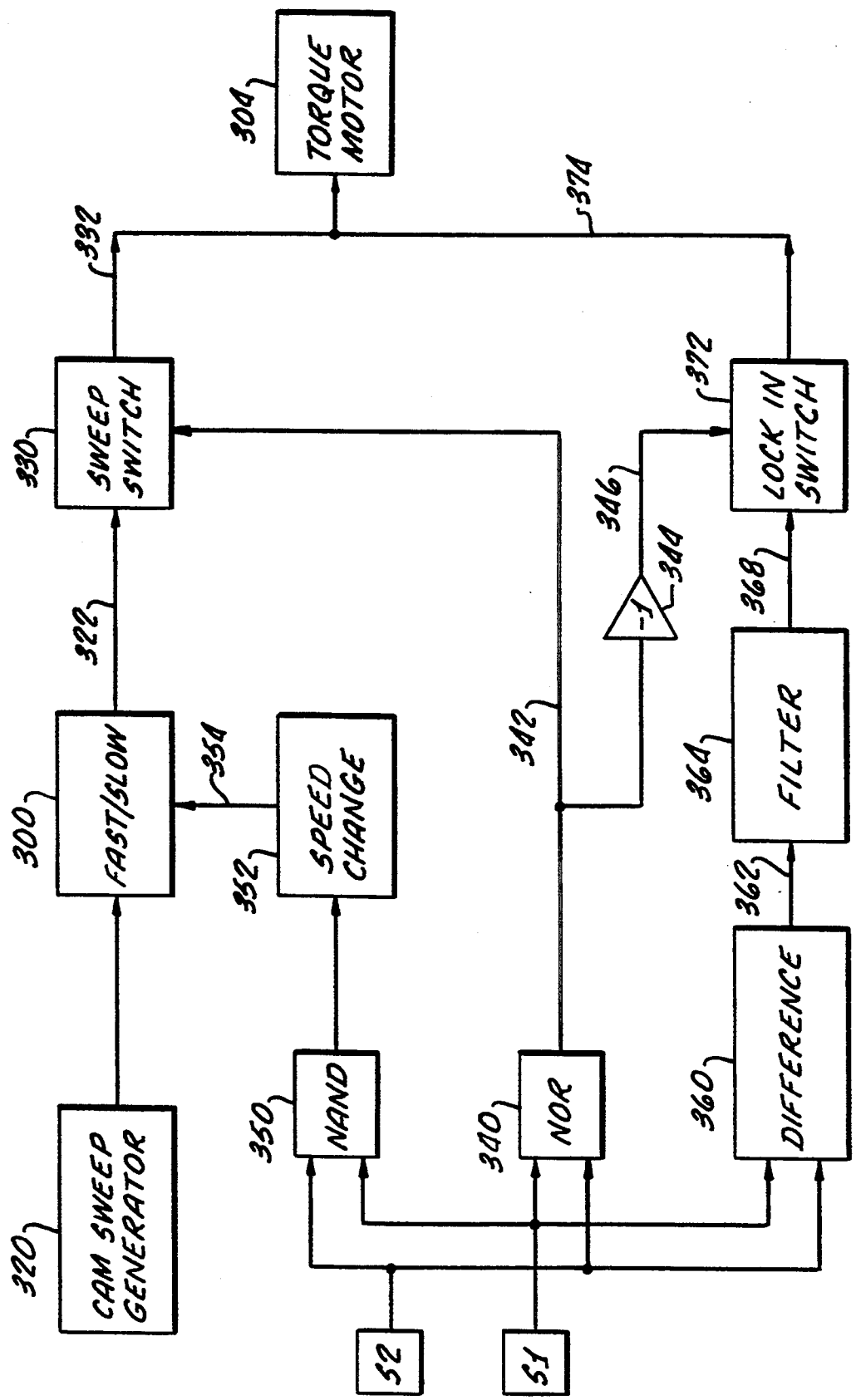
FIG. 5 is a block diagram of the sweep control circuit of FIG. 4.

As power is applied to the system the control circuit, more particularly illustrated in FIGS. 4, 5 and 6, generates a triangular wave sweep voltage that is applied to the torque motor to cause it to perform its sweeping action.

Simultaneously, a laser beam emitted from the laser strikes the mirror 88, which is now oscillating in its scanning sweep, and sweeps across the work area. As the beam sweeps, it sweeps across the corner reflector, which in turn will retro-reflect the beam to the mirror 88, which then reflects the beam back to the photo cells of the interferometer of the laser unit. Control circuitry causes the mirror to lock onto the corner reflector and stop the scanning sweep. If the corner reflector then moves to one side or the other the beam is no longer returned from the retro-reflector along a central optical path, creating an imbalance of light that causes the mirror to move to retain its lock on position. If for some reason the path of the beam is interrupted, the photo cells signal that no light is received and the control circuit then reactivates the sweep, which again starts as described above.

It may be noted that the described system controls a sweeping beam in a horizontal plane and measures only in a horizontal plane. However, an equivalent arrangement can be added to control a beam sweeping simultaneously in a vertical plane, to thereby enable three dimensional position measurement.

ELECTRONIC CONTROL OF SCAN MIRROR

Functional aspects of the sweep control of the lighthouse mirror are broadly illustrated in FIG. 4. An oscillating sweeping scan is used initially in a search mode to find the corner reflector. When the beam finds the corner reflector, a fine positioning control of beam angle takes over to keep the beam directed at the corner reflector during subsequent motion of the tool and its corner reflector. While the beam is locked on to the corner reflector by the fine positioning control, measurements of distance changes are made repetitively.

A sweep signal is generated by a sweep generator 300 and sent through a fast/slow control circuit 302 that provides a signal to scanning mirror torque motor 304 to cause it to sweep at a fast rate or at a slower rate, which may be 1/6th the speed of the fast rate. In the course of the sweep the beam will intersect the corner cube, which initially reflects a beam back to sensor 306 that receives a retro-reflected beam that is not yet exactly centered. This occurs when the outgoing beam has captured the corner cube but the retro-reflected beam is not precisely centered on the sensor. The off-center reflection is employed to slow the sweep speed by causing the sensor 306 to send out a signal on a sweep speed control line 308 that controls the fast/slow speed 302. As the mirror continues its sweep, now at a lower speed, the retro-reflected beam will illuminate a larger area of the sensor. The sensor now sends out a signal on a line 310 that locks in the torque motor near center position and disables the sweep. The lock-in signal on line 310 acts much like a fine position control that takes over from the sweep control when a near center position of the retro-reflected laser beam is sensed. The lock-in voltage is effectively proportional to a small amount of displacement of the retro-reflected beam to one side of the center of the sensor and provides a fine positioning voltage to drive the torque motor so that the retro-reflected laser beam is moved toward a precisely centered position on the sensor.

Illustrated in FIG. 5 is a block diagram providing a more detailed understanding of the functions of the scanning mirror sweep control. A triangular sweep signal is generated by a cam sweep generator 320 that is built into the lighthouse structure itself, (e.g. cam 70, cell 82 and LED 84). The sweep signal is fed to fast/slow speed control 300, having an output on a line 322 that is fed through a sweep switch 330, which has an output on a line 332 that is fed to the torque motor 304. When switch 330 is closed the torque motor is driven by the sweep voltage. When switch 330 is open the torque motor is no longer driven by the sweep voltage. Sensors S1 and S2 are the photosensitive transistors 42,44 shown in FIG. 2 that generate a voltage upon receipt of a light signal. When the retro-reflected beam is precisely centered at the center aperture, the two sensors receive equal amounts of light. At positions slightly off center the sensors receive different amounts of light and thereby put out different signal levels, or one may receive light and the other no light. When both sensors are dark, a NOR gate 340 connected to receive the outputs of both sensors provides a high signal on a line 342, which is fed as a first control input to the sweep switch 330. Accordingly, with a high signal on line 342, the sweep switch is closed and the sweep voltage is fed from the cam sweep generator 320 to the torque motor, causing the motor to sweep at a high speed in the course of its search for the corner reflector. When light is received by either one or both of sensors S1 and S2, a NAND gate 350 connected to receive the outputs of both of the sensors feeds a signal to a speed change switch 352, which sends a signal via a line 354 to the fast/slow speed change circuit 300 to change the magnitude of the voltage fed to the torque motor and slow the sweep rate to about one sixth of its fast rate.

When retro-reflected light illuminates both cells S1 and S2, a difference circuit 360 connected to both of the cells provides a lock-in voltage on a lead 362 which is fed through a filter 364 to provide a lock-in drive voltage on an output line 368. The lock-in voltage is fed via a lock-in switch 372 to the torque motor 304. When light is received by both sensors, sweep switch 330 is disabled via line 342 and the output of NOR gate 340 is inverted in an inventor 344 to feed a lock-in switch control signal via a line 346 to close lock-in switch 372 to allow the lock-in voltage on line 368 to operate the torque motor via a line 374.

Figure 6A:
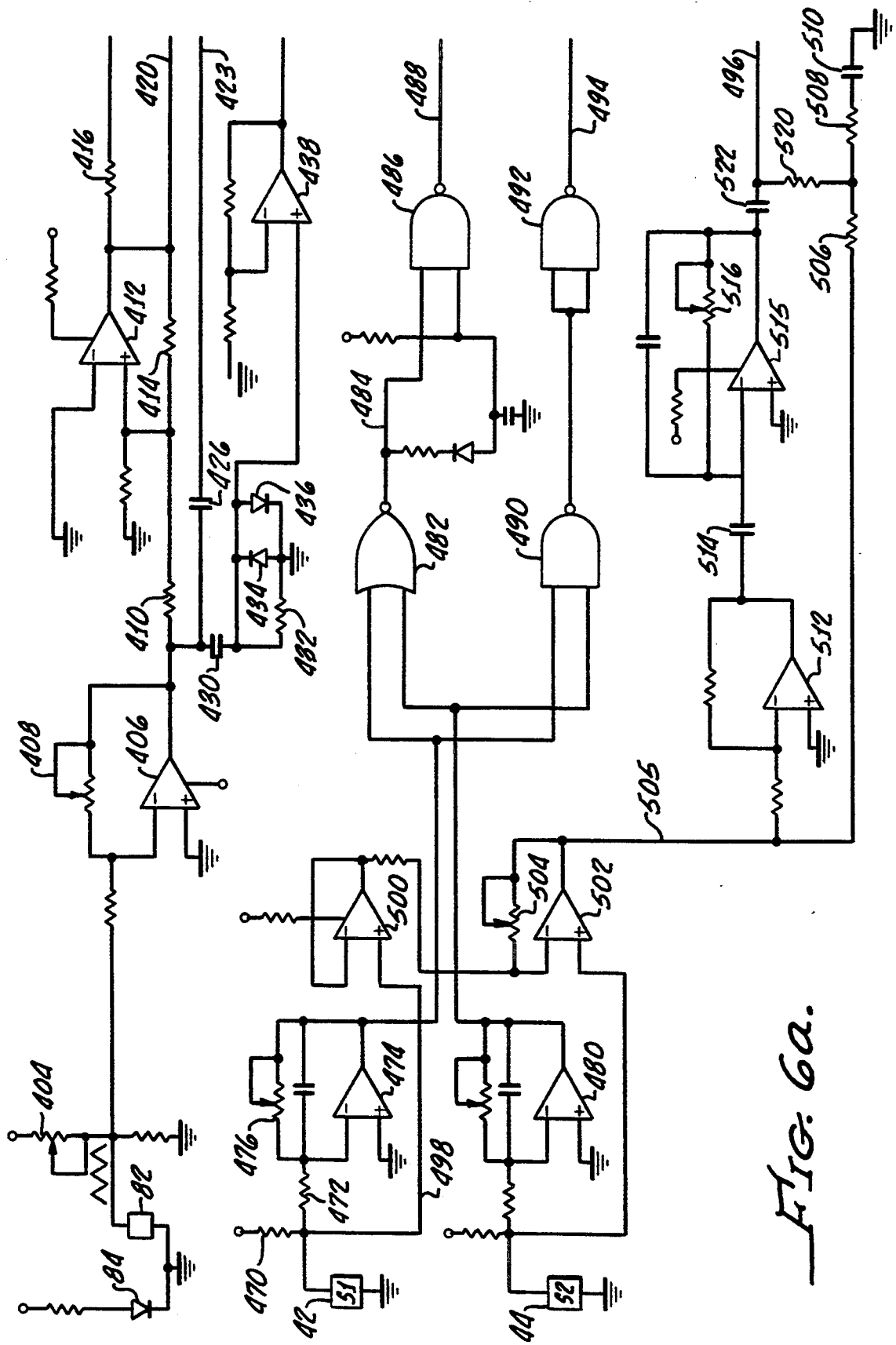
FIGS. 6a and 6b together form a detailed circuit diagram of the beam sweep control.
Figure 6B:
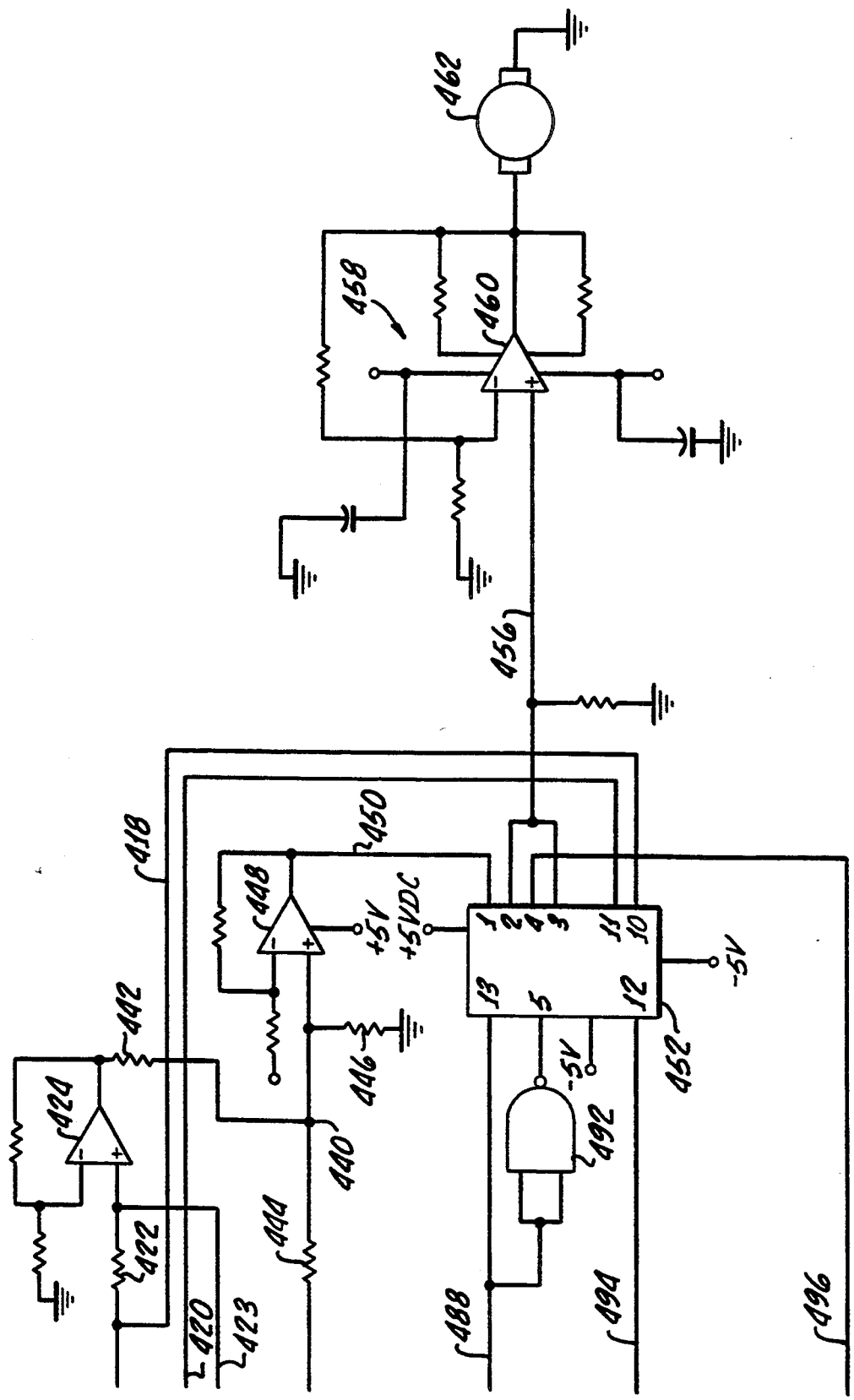

Details of the torque motor control circuit are illustrated in FIG. 6 (FIGS. 6a and 6b together form this circuit, with FIG. 6a placed to the left of FIG. 6b), which shows the ultraviolet light emitting diode (LED) 84 which is mounted on the scanning structure opposite the photovoltaic sensing cell 82 (see also FIG. 3) with the cam 70 interposed between them. A potentiometer 404 is connected to the output of the photocell 82 and adjusts the current from a fixed source, such as 5 volts, against the current generated by photocell 82. This adjusts the average rotational position of the mirror during calibration. The adjusted output of the photocell is fed to the inverting input of an operational amplifier 406, having its non-inverting input grounded, and having a potentiometer 408 in its feedback loop. The potentiometer adjusts feedback current to cause the output voltage of amplifier 406 to provide an excursion of plus or minus 4 volts over the full oscillating swing of the mirror. The output of amplifier 406 is fed through a resistor 410 to the non-inverting input of a second operational amplifier 412. This input is mixed with a feedback signal via a feedback resistor 414 connected between the output of amplifier 412 and its non-inverting input. A resistor 416 connected to the output of amplifier 412 effectively comprises the fast/slow speed change arrangement and has its opposite ends connected to lines 418,420, respectively, which initially are connected to short out the speed control resistor 416. Thus the sweep voltage is fed through a resistor 422 to the non-inverting input of an operational amplifier 424, having an output that is fed to the torque motor 462 via a unity gain amplifier 448, a multiple FET switch chip 452, and a power amplifier 458,460.

As the scanning mirror oscillates, light sensitive transistor 82 provides a triangular current wave output that is compared with the feedback current controlled by potentiometer 408 and fed to the inverting input of operational amplifier 406, which has its non-inverting input grounded. The inverting input to amplifier 406 increases during a sweep of the mirror in one direction, and upon reversal of the mirror direction the input current to amplifier 406 decreases, providing an output from amplifier 406 that is a triangular wave which swings between plus and minus 4 volts and identifies the exact momentary position of the mirror. The output of amplifier 406 is fed to the non-inverting input of operational amplifier 412, where this changing voltage, summed with the output voltage of amplifier 412, is compared with the fixed ground potential at the inverting input of amplifier 412. When the signal to the non-inverting input of amplifier 412 has one polarity with respect to ground the amplifier is saturated with that polarity because of its positive feedback via resistor 414, and stays in this condition of saturation to drive the mirror in a first direction. For example, should the non-inverting input of amplifier 412 be positive, the amplifier is saturated, with a positive signal being fed from the output of amplifier 412 to the torque motor via amplifier 424, amplifier 418, the FET switching chip 452 and the power amplifier 460. In this direction of sweep the output voltage of amplifier 406 is decreasing because of the triangular wave signal provided to its inverting input from photo cell 82. When the voltage at the non-inverting input of amplifier 406 goes below the fixed level (ground) applied to the inverting input of amplifier 412 the voltage at the non-inverting input of amplifier 412 changes to a negative value and amplifier 412 immediately switches to a saturation condition with a negative input and output. The negative output of amplifier 412 therefore changes the direction of the sweep (by reversing polarity of voltage to the torque motor) to cause the mirror to scan in the opposite direction. This reversal of mirror sweep direction causes the voltage output at the output of amplifier 406 to begin to increase until it goes high enough for the input to amplifier 412 to go above ground, and thus the output of amplifier 412 switches between positive and negative saturation and the torque motor drives the scanning mirror back and forth in an oscillating sweep.

As the output of amplifier 406 begins to sweep, the connection of its output to a capacitor 426 effectively nullifies the input to the non-inverting input of amplifier 424 so as to cause the output of amplifier 424 to be just sufficient to drive the torque motor. If the torque motor were to stop momentarily the output voltage from amplifier 406 would stop sweeping because the sweep generating cam has stopped. However, capacitor 426 would continue to charge from the output of amplifier 412, through resistor 422 (at the non-inverting input of amplifier 424) and a line 423, and the signal provided to the non-inverting input of amplifier 424 would continue to increase as the capacitor charges. Therefore the torque motor power would increase and the sweep would start again. During normal sweep the output of amplifier 412 continues to charge capacitor 426 via resistor 422 to provide a continuously increasing voltage to amplifier 424. Thus the RC time constant of capacitor 426 and resistor 422 determine the speed of the mirror sweep. Resistor 416 is shorted out during the fast sweep, but when connected in the circuit, the RC time constant increases to lower the speed of the mirror sweep. The magnitude of sweep excursion is determined by the point at which the voltage output from amplifier 406 toggles the amplifier 412.

In order to provide a lead phase voltage for stability of the torque motor drive, the signal at the output of amplifier 406 is fed through a phase shifting RC combination of a capacitor 430 and a resistor 432, through a voltage limiting network, including oppositely poled diodes 434 and 436, to an operational amplifier 438 that boosts the lead voltage by a factor of about 10. The motor control voltage at the output of amplifier 424 and the lead voltage at the output of amplifier 434 are combined at point 440, which comprises the output of a summing network, including resistors 442, 444 and 446. The output of the summing network is fed to the non-inverting input of a unity gain driver operational amplifier 448 from which the output is fed via a line 450 to an input pin 1 of a multiple FET gate chip 452, having a plurality of switched outputs and a number of switch controlling inputs. The switched outputs include pins 1, 2, 3, 4, 11 and 10, and the switch controlling inputs include pins 5, 12 and 13. A high on pin 13 effectively interconnects pins 1 and 2. Similarly, a high on pin 5 interconnects pins 3 and 4 and a high on pin 12 interconnects pins 10 and 11. The switched outputs are open (very high impedance) when a low is provided to the respective control pins. With appropriate control inputs, pins 1 and 2 of the multiple FET gate chip are connected to each other to feed the power signal on line 450 via a line 456 to power amplifying circuit 458, including an operational amplifier 460, from the output of which the drive signal is fed to torque motor 462.

The pair of phototransistors S1 and S2 (corresponding to photo cells 42,44 of FIG. 2) are mounted at the input/output orifice of the interferometer 18 (FIG. 1). When no laser light is present cell S1 generates no current. However, negative current through a resistor 470 provides a slight negative voltage at the left end of a resistor 472 that tries to pull the inverting input of an operational amplifier 474 to a negative level. The non-inverting input of this amplifier is grounded and the action of the amplifier causes the voltage at its inverting input to match the grounded input to the other input. If the voltage on the inverting input tries to go negative, the output of the amplifier 474 will go positive and current through a feedback potentiometer 476 supplies the correct current to nullify the negative charge at the inverting input to restore the matching voltage at the amplifier inputs. When light is received by cell S1 a current is generated in an amount sufficient to override the negative current supplied by resistor 470 to cause the junction of resistors 470 and 472 to go slightly positive.

Cell S2 and operational amplifier 480 are connected in a substantially identical circuit and operate in the same way as described in connection cell S1 and amplifier 474.

When both cells S1,S2 are in the dark (e.g. neither receives any retro-reflected light), the outputs of amplifiers 474 and 480 feed high signals to the two inputs of a NOR gate 482, to produce a low on a NOR gate output line 484. The output of NOR gate 482 provides one of two inputs to a NAND gate 486, which, having a low input, provides a high output on its output line 488. This high is fed to a control pin 13 of the multiple FET gate 452 to cause connection between pins 1 and 2 of the gate 452, and thus supply the sweep voltage from the output of driver amplifier 448 through pins 1 and 2 of the gate to the motor drive power amplifier, thereby causing the mirror to oscillate through its searching sweep.

A NAND gate 490 receives an input from each of cells S1,S2 via the amplifiers 474 and 480 to signal the occurrence of light received by a single one of the cells. When light is received by one of the cells, one of the inputs to NAND gate 490 goes low to provide a high output that is fed to both inputs of a NAND gate 492, causing a low on output line 494 of this gate and a low at a control pin 12 of the FET gate 452. In the absence of a low at pin 12, pins 11 and 10 of the FET gate are connected to one another, and thus, via lines 418 and 420, connected to opposite ends of resistor 416, to short out this resistor and produce a high speed sweep. The shorting of the resistor 416 is eliminated by the low on control pin 12 when one of the cells S1,S2 receives light, and thus the sweep signal now passes through resistor 416, which accordingly slows the sweep to an amount approximately 1/6th the speed of the original sweep speed.

When retro-reflected light reaches the second of the two cells S1,S2, so that both receive light, the system effectively switches to its fine control and the sweep stops. Both inputs of NOR gate 482 go low. The output of NOR gate 482 is fed via NAND gate 486 to control pin 13 of the FET gate 452 which goes low. The output of NAND gate 486 is connected to both inputs of a NAND gate 492, which has its output connected to control pin 5 of the FET gate and operates as an inverter. Thus when pin 13 of the FET gate goes low, pin 5 simultaneously goes high. The low on pin 13 disconnects pins 1 and 2 from one another, to block transmission of the sweep voltage from amplifier 448 to the torque motor. However, the high at pin 5 interconnects pins 3 and 4 of the FET gate, which are now connected to feed the lock-in voltage from a line 496 to the power amplifier. As previously mentioned, the lock-in voltage is a fine position control that moves the torque motor by small amounts tending to center the light beam on the two photo cells S1,S2 so that equal light is received by the two of them.

The lock-in voltage on line 496 is generated by comparing the output signals of the two cells S1 and S2. The output of cell S1 is fed via a line 498 to the non-inverting input of an operational amplifier 500, having an output connected to the inverting input of an operational amplifier 502, with a potentiometer 504 connected between its output and its inverting input. The non-inverting input of operational amplifier 502 is connected to receive the output of the second cell S2. Operational amplifier 500 provides a unity gain, whereas the gain of operational amplifier 502 is established by adjustment of its feedback potentiometer 504, so that the output voltage of amplifier 502 is proportional to the difference in the amount of light falling on the two cells S1,S2. This difference at the output of amplifier 502 is fed via a line 505 to a low pass filter network including resistors 506,508 and a grounded capacitor 510.

As with the main sweep voltage, a leading phase voltage is required for stability. To this end the lock-in voltage at the output of amplifier 502 is fed to a phase inverting operational amplifier stage 512, and thence through a lead producing capacitor 514 to the inverting input of an operational amplifier 515, having a potentiometer 516 connected in a feedback loop from its output to its inverting input. Adjustment of potentiometer 516 will tune the leading phase voltage for maximum damping at the natural resonant frequency of the oscillating mirror. The lock-in voltage at the junction of resistors 506 and 508 is combined via a resistor 520 with the lock-in leading phase voltage that is coupled from the output of amplifier 515 through a capacitor 522 to provide the fine position adjustment lock-in voltage on line 496.

EXEMPLARY MULTI-SPINDLE DRILLING MACHINE

It will be readily understood that the described position measuring system is adaptable for measurements in many different types of machine tool applications, including drilling machines, routing machines, pick and place machines, and part gaging systems, among others. The system has been initially employed for tracking and measuring the spindle positions of a multiple spindle drilling machine, and accordingly application to such a use will be described. In a presently contemplated configuration, a computer controlled machine tool comprises an unguided tool carrying carriage mounted for low friction motion in a plane parallel to the precisely flat surface of a machine table and guided only by the support of the unobstructed horizontal table surface. Three mutually angulated extensible actuators are provided to move the carriage over the machine table to controlled positions and orientations. As shown in FIGS. 7 and 8, an exemplary multiple spindle drilling machine has a tooling plate 110 fixedly mounted on a massive base, such as a lower granite table 112, and carries a workpiece (or workpieces) 114 in which a plurality of holes are to be drilled simultaneously by drill bits mounted in spindles 116,118,120,122, and 124 (see FIG. 8). Each spindle is fixedly carried in a spindle assembly, such as assembly 130, that is rigidly carried by a massive and stiff spindle bar 132 that extends across substantially the entire width of the tooling plate 110 and carries all spindle assemblies. The spindle bar 132 is fixedly mounted upon and depends from a movable spindle support structure or carriage comprising a rigid forward support section having rearwardly extending lateral trusses 136,137 fixedly interconnected by a transverse structure 138. The carriage includes a rigid rear support section having rearwardly and inwardly extending trusses 139,140 rigidly connected to the forward support section and to the transverse structure 138. The forward support section extends across the full width of the tooling plate 110 (e.g. perpendicular to the plane of the drawing in FIG. 7).

Support posts 141,142 are fixed to and depend from trusses 136,137 at an intermediate section of the carriage, and each carries a sliding air shoe 146,147 (FIG. 8) that slidably mount the carriage, without any guideways, upon the smooth, flat upper surface of the granite table 112 with a minimum of friction. Rear trusses 139,140 converge at the rear of the carriage and carry a single centrally positioned air shoe 148 that bears upwardly against the lower flat surface of an upper granite table 149 that is fixedly supported by standards 135 from and above a rear portion of lower granite table 112. Thus the spindles, spindle assembly structure and spindle bars, at a forward section of the carriage, are effectively cantilevered out forwardly (toward the right as seen in FIG. 7) of the support posts 141,142 and supported on the lower air shoes 146,147, at an intermediate section of the carriage. The upper air shoe 148 at a rear section of the carriage provides a reaction to the clockwise (as viewed in FIG. 7) turning moment exerted by the mass of the forwardly cantilevered structure. The arrangement includes no guideways, so that the entire structure is freely movable on its nearly frictionless air shoes in any direction and to any position on the unobstructed surface of the granite table 110.

Three motor driven drive screws 150,152,154 (FIG. 8) are provided to horizontally drive the carriage, including support trusses, spindle bar, spindle assembly and spindles, to different horizontal positions in an X,Y coordinate system so as to enable simultaneous drilling of five holes at selected positions on the workpiece. Each spindle carries a drill bit rotated at high speeds in the spindle assembly structure 130. The drive screws include independent drive motors 151,153,155 mounted to the table 112 for pivotal motion about fixed vertical axes 156,157,158, respectively, at the rear of the table 112. The screws are respectively threadedly received in sleeve nuts 150a, 152a, 154a that are pivotally connected to spindle bar 132 at transversely spaced locations on vertical pivot axes 159,161 and 163, respectively. In a home position, all screws extend roughly at forty five degrees to the X,Y axes (which are parallel to the sides of the granite table 112. Screws 152 and 154 are roughly parallel to one another and screw 150 extends at an angle of about 90° to the other two screws, crossing screw 152. One of the crossing screws 150,152, such as screw 152 for example, lies in a plane above the common plane of the other two drive screws to avoid interference.

The lengths of the three drive screws are controlled individually on the basis of laser distance measurements made by three laser measuring systems of the type described above, each measuring a distance in a direction generally parallel to the associated drive screw. As will be described more particularly below, the effective length of each drive screw is controlled so as to move the spindle bar 132 through positions that are at all times parallel to a reference position. This parallel position is employed for simultaneously drilling multiple holes in multiple circuit boards, although other motions may be commanded if desired. The three screws cooperate to collectively control both position and orientation of the spindle bar.

To employ the laser distance measuring system described above for locating and controlling X,Y position of the spindles 116–124 of FIGS. 7 and 8 in a given X,Y plane, three distance measurements are required. Given three distances to an object from three known points having positions fixed in the X,Y reference system, the position of the object may be defined. Accordingly, spindle bar 132 fixedly carries three mutually spaced corner reflectors 160,162, and 164, which cooperate respectively with individual ones of scanning mirror assemblies 166,168,170. Each of the scanning mirror assemblies 166,168 and 170 is identical to the scanning mirror assembly structure illustrated in FIG. 3, except for different locations and different angular positions of the scanning beam sweeps. The centers of the several scanning sweeps, shown by dash-dot lines 165,167,169, are each respectively adjacent to and generally, but not precisely, parallel to an individual one of the drive screws.

Although other configurations may be employed to obtain three laser beams, it is convenient to employ a single laser 174 (FIG. 8), centrally located on table 112, that sends a laser beam to a first beam splitter 176, which turns the beam to direct it over a first receiver 178 to a first interferometer 180. The beam is turned by the interferometer 180 and reflected to the scanning mirror of mirror assembly 170, which reflects the beam in a scan centered about a line generally indicated at 167 to the corner reflector 164 fixed to the moving spindle bar. The corner reflector retro-reflects a lowered beam to the mirror assembly 170, which reflects the beam back to the interferometer 180, which then provides an output light beam of varying light and dark pulses to the receiver 178. This receiver then produces a count representing an incremental change of distance along beam path 167 between the optical center of the corner reflector 164 and the fixed vertical optical axis of the scanning assembly 170. Each of the scanning assemblies, beam splitters, interferometers, and receivers is mounted to the fixed granite table in fixed locations. The scanning assembly locations precisely locate the fixed vertical axes of the scanning assemblies.

For measurement to corner reflector 160 the laser beam from laser 174 passes through the first beam splitter 176 and is turned by a second beam splitter 186 to be reflected over a second receiver 188 to a second interferometer 190, which turns the beam to cause it to impinge upon the mirror of scanning mirror assembly 166. The latter reflects the beam in a sweep that is centered along line 165 and sweeps over the corner reflector 160, which retro-reflects the beam to the mirror of scanning assembly 166 along a lowered path. The mirror assembly sends the lowered retro-reflected beam back to interferometer 190, which then sends to the receiver 188 a light and dark output beam that enables the receiver to generate an output signal representing an incremental change of distance along path 165 between the precisely and fixedly positioned vertical scanning axis of scanning assembly 166 and the optical center of the corner reflector 160.

Similarly, for the third corner reflector 162, the beam of the same laser 174 is turned through 90° by a third beam splitter 196 (after passing through beam splitters 176,186) to pass over a third receiver 198 to a third interferometer 200, which turns the beam to impinge upon the scanning mirror of the third scanning mirror assembly 168. The latter sends the beam in its sweep along the path centered at 169 to impinge upon corner reflector 162. The retro-reflected beam from the corner reflector is sent back to the interferometer, which sends the lowered beam of alternate light and dark pulses to the receiver 198.

By tracking the corner reflectors (which are fixed to the spindle bar) the drill spindles and bits are also tracked. By measuring distances to each of three corner reflectors, the X,Y position of the spindle bar may be calculated. This allows calculations of the spindle and therefore drill bit positions with the extreme accuracy of the interferometer measurements. The distances are measured with an accuracy defined in millionths of an inch. The measured distances are used to generate commands to the drive screws which are rotated by their respective drive motors until the measured distances attain calculated values that position the spindle bar in its desired X and Y positions.

Figure 9:
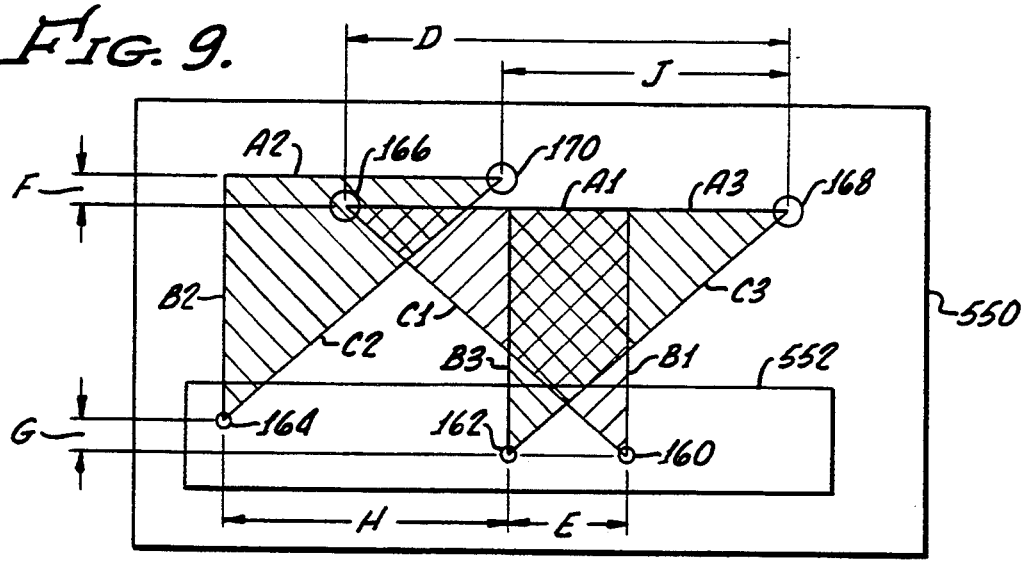
FIG. 9 illustrates geometry of measurements made for measuring tool position.

An understanding of the mathematics involved in calculating X,Y position from three separate distance measurements may be facilitated with a discussion of the geometry shown in FIG. 9.

CONTROL MATHEMATICS

FIG. 9 illustrates an expository geometrical layout of three scanning mirrors and the accompanying three corner cubes. This drawing shows the three imaginary right triangles that are inherent within this configuration and which are utilized in the calculations of distance changes. The outer rectangle 550 indicates the boundary of a work table upon which a plurality of workpieces are positioned. The elongated rectangle 552 represents the spindle bar 132 shown in FIGS. 7 and 8. Circles 166, 168 and 170 correspond respectively to scanning mirror assemblies 166, 170 and 168 of FIG. 8. Corner cubes 160, 162 and 164 are illuminated respectively by light from the scanning mirrors 166, 168 and 170. Geometrically, a right angle triangle is laid out with a hypotenuse between each scanning mirror and its associated corner cube. Thus a first right triangle, having sides A1, B1 and C1, has its hypotenuse C1 extending between scanning mirror assembly 166 and corner cube 160. A second right triangle has its hypotenuse C2 extending between the second scanning mirror 170 and the second corner cube 164 and has sides A2 and B2 extending horizontally parallel to the X axis and vertically parallel to the Y axis, respectively (as viewed in FIG. 9). The third right triangle has its hypotenuse C3 extending between scanning mirror assembly 168 and its corner cube 162 and has a side A3 parallel to the X axis and a side B3 parallel to the Y axis. Distances D,E,F,G,H and J, all indicated on the drawing of FIG. 9, are employed in the calculation. The scanning mirror assemblies are all fixedly positioned in the X,Y reference system, and the corner cubes are all fixedly positioned relative to one another on the moving spindle bar 552. In the system described herein the spindle bar 552 is always moved and maintained in an orientation that is parallel to the X axis. This is not due to limitations of the positioning system, which can control a variety of other positions and orientations, but is desired for proper use of a multiple spindle drilling machine. In the course of motion of the spindle bar 552 it is driven by varying the lengths of the three drive screws in a manner that causes the spindle bar to remain parallel to its initial position at all times. The spindle bar, as previously mentioned, carries a plurality of spindles which drill identical hole patterns in each of a plurality of workpieces, and thus it is necessary, in this exemplary application, that all spindle bar positions be parallel to one another.

At an initial or home position the following mathematical relationships are true:

A1=A2=A3
B1=B2=B3
C1=C2=C3
F=G
H=J
D+E=A1+A3

The axis of the spindle bar 552 is parallel to a line between scanning mirrors 166 and 168.

The sides B1, B2 and B3 of the several triangles are and always remain parallel to each other. Sides A2 and A3 are and always remain equal to each other in length. In this arrangement, in which the spindle bar is mounted for motion without any guideways and is driven by three extensible screw actuators, motion of the spindle bar is commanded by changing the length of the hypotenuse of each triangle (C2, C3 and C1). Each hypotenuse is the actual line of sight between the axis of rotation of the associated scanning mirror assembly and the optical center of its associated reflector cube and enables measurement of an incremental change in length of this line of sight. As previously mentioned, each screw actuator is adjacent and roughly parallel to the associated line of sight (hypotenuse) and such hypotenuse is changed in length by a commanded change in length of its associated screw actuator.

When the hypotenuse value changes, a change in the other triangle legs, A and/or B, also takes place. However, these values of A and B are computed, rather than actually measured, by the Pythagorean theorem $C^2 = A^2 + B^2$.

The distances D, E, F, G, H and J are all fixed distances and do not change during motion of the spindle bar 552. Only the lengths of the sides of the triangles change. The spindle bar is moved in X and Y by changing the length of hypotenuse C2, hypotenuse C3 and also C1. A move of the spindle bar in a direction parallel to the Y axis (parallel to triangle sides B1, B2 and B3) is commanded by changing the hypotenuse values of all three triangles equally. A change in any one hypotenuse is accomplished by changing the length of its associated screw actuator, concomitantly measuring the hypotenuse, and continuing to operate the screw actuator until the hypotenuse attains the desired length. New hypotenuse values for each of C1, C2 and C3 will create equal changes in the values of all three B sides, moving the spindle bar not only to its new position but also maintaining it parallel to its original position.

To move the spindle bar along the X axis, lengths C2 and C3 are incremented or decremented equally and in the same sense. This will maintain the spindle bar parallel to the scanning mirror assemblies. However, the length C1 is changed in a sense opposite to the sense of change of C2 and C3, and with an independent value of change.

For a move along either or both axes, the incremental change detected by the laser system is employed to calculate actual present position of the corner reflector, which is used to change the length of one or the other of the driving screws until the calculated actual position of the corner reflector is equal to the commanded position. Calculation of an incremental change detected by the laser system employs the equation:

$$\Delta CX = CX\text{old} - CX\text{new}$$

where $\Delta$ is the incremental change along either axis, X denotes the individual triangle, that is, 1, 2, or 3, depending upon which of the triangles is being used for calculation, "old" is the position of the drill bit before it is moved, that is, the length of C at the old position, and "new" is the position of the drill after being moved.

The position CXold is known through the equation:

$$CX\text{old} = (AX^2\text{old} + BX^2\text{old})^{\frac{1}{2}}.$$

The CXnew position is calculated from the equation:

$$CX\text{new} = (AX^2\text{new} + BX^2\text{new})^{\frac{1}{2}}.$$

To perform the CXnew calculation, AXnew and BXnew values must also be computed. It will be recalled that when moving along the X axis C1 is calculated in an opposite sense with respect to the calculation of C2 and C3, so that the calculation for C2 uses the value of AXnew = AXhome + x and the value of BXnew = BXhome + y, where "home" is the value at the machine home position, x is the coordinate value along the X axis at the new position, and y is the coordinate value along the Y axis at the new position. The calculation for C3 is similar to the calculation for C2.

C1, as mentioned above, is calculated in an opposite sense along the X axis. For example, in driving the spindle bar toward the right as viewed in FIG. 9, C2 and C3 decrease in length, whereas C1 increases in length, and visa versa. The calculation of C1new employs the value of A1new = A1home − x and a value of B1new = B1home + y.

As previously mentioned, the system disclosed to this point will measure positions in a single plane, namely the X,Y plane, but can be readily adapted to measure in three dimensions by employing additional scanning mirror assemblies and corner reflectors, with the scanning mirror assemblies scanning vertically about horizontal axes and a corner reflector provided for each of the additional scanning mirror assemblies.

For simplified exposition of principles of the present invention it has been described in connection with a multiple spindle drilling machine movable without guideway restraint over a flat, horizontal support base under control of three extensible screw drives. However, principles of the position measurement system described herein are applicable to many other and significantly different types of tool mechanisms having many different types of motions and many different types of drives. It is applicable to a tool positioning system employing various arrangements of pivoted arms or parallel linkages, as shown for example in U. S. patent application Ser. No. 07/740,151, filed Aug. 5, 1991, for Arrangement For Providing Planar Movement of a Machine Tool, of William F. Marantette.

Although X,Y position of a driven but unguided machine tool is provided in the embodiment described above by measurement of three distances and employing three scanning mirror assemblies and three retro-reflectors, it will be readily appreciated that principles of the invention may be applied to position measuring systems which measure only two such distances and a related angle. In fact, principles of the present invention may be applied to a position measuring system which employs a scanning mirror and retro-reflector as described herein for measurement of only a single distance, with remaining position information being obtained by angle measurement through appropriate angle encoders or the like. Thus, position measurement embodying principles of the present invention may be used where one or two distances are measured and one or no angles are measured. In one type of pick and place machine, for example, position may be controlled by measuring two distances, as will be described below.

PICK AND PLACE MACHINE

Figure 10:
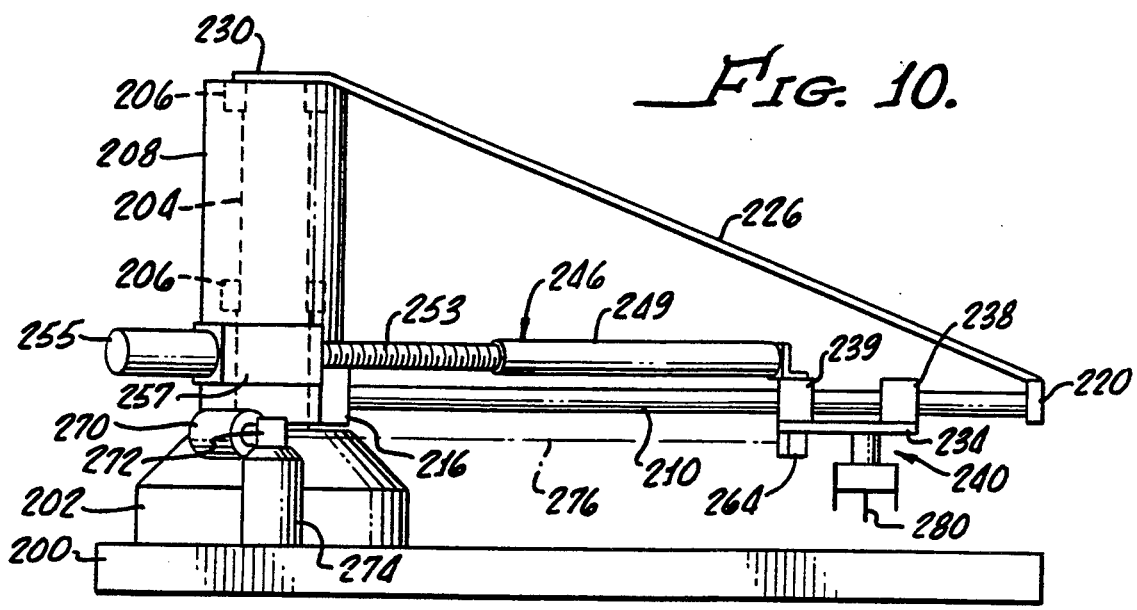
FIGS. 10 and 11 are side and plan views, respectively, of an embodiment of the invention applied to a pick and place machine.
Figure 11:
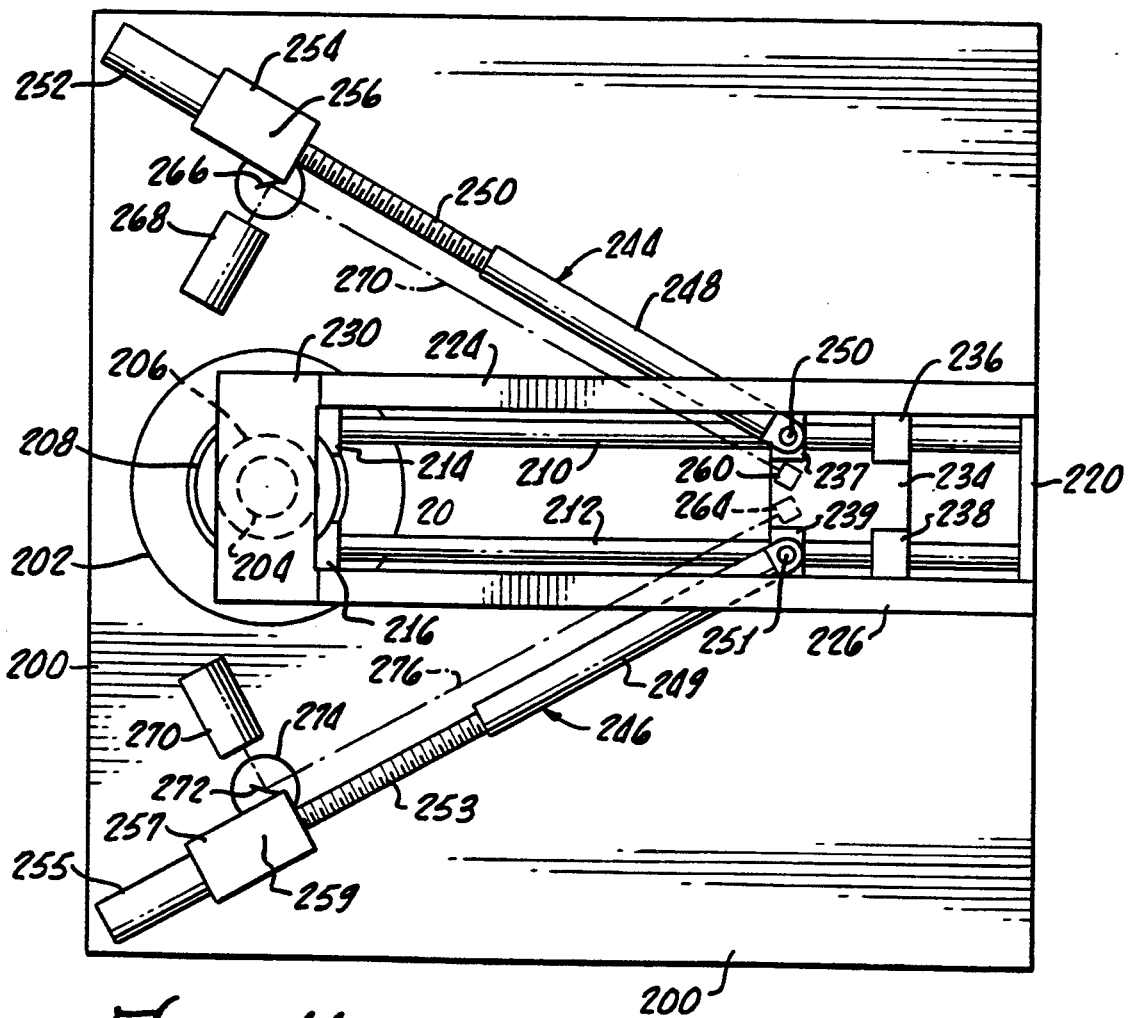

A conventional pick and place machine is commonly used to pick up objects from one location and place them in another location, generally for purposes of assembly of a part to an object at the other location. Application of principles of the present invention to such a pick and place machine is illustrated in FIGS. 10 and 11, which respectively show side and plan views of such a machine.

Mounted on a rigid tabletop or work table 200 is a fixed base 202 carrying a rigid upstanding post 204 on which a rotatable outer tube 208 is mounted for rotation about a vertical axis, by means of bearings such as bearings 206. A pair of mutually spaced and mutually parallel horizontal guide rods 210,212 have inner ends thereof fixedly secured to brackets 214,216, respectively, that are fixedly carried by the rotatable outer tube 208. Outermost free ends of the guide rods 210,212 are rigidly connected to ends of a transverse hanger bar 220 that is fixedly secured at opposite ends thereof to a pair of bar hanger straps 224,226, having their innermost ends securely connected to a hanger strap cross bar 230 that is fixedly carried at the top of and rotatable with the rotatable outer tube 200.

A sliding rectangular platform 234 rigidly carries first and second laterally spaced pairs of longitudinally aligned rod guides 236,237 and 238,239, which are apertured to slidably receive the guide rods 210,212, thereby slidably mounting the platform 234 for motion along the length of the parallel guide rods. The platform carries a depending mechanical hand 240 which may be of any suitable conventional configuration capable of grasping and releasing a part to be picked up and placed. A typical conventional mechanical hand 240 may include structure for grasping, rotating and inserting parts into printed circuit boards and may be capable of many independent motions relative to its mounting platform, including Z axis or vertical motion.

The platform 234 is driven along the guide rods, and the assembly of guide rods and platform is pivoted about the vertical axis of rotation of tube 208 by a pair of independently operable extensible screw actuators 244,246. Actuator 244 includes a lead screw nut and extension tube 248 that is pivoted at its outer end on a vertical axis 250 to rod guide 237 that is fixed to the platform 234. A lead screw 250 threaded in lead screw nut 248 is driven by a servo motor 252 carried on a bracket 254, which also supports the innermost end of lead screw 250. Bracket 254 is pivoted on a vertical axis 256 to the fixed base 202.

Lead screw 246 is identical to lead screw 244, including a lead screw nut and extension tube 249 pivoted to the platform on a forward pivot 251 and threadedly mounting a lead screw 253 driven by a servo motor 255 and mounted in a bracket 257, which is rotatably carried on a fixed vertical pivot axis 259.

Controlled extension or contraction of one or the other or both of the extensible screw actuators drives the platform forward and backward along the guide rods and also swings the assembly of guide rods and platform about the center of rotation of outer tube 208, thereby enabling the positioning of the mechanical hand 240 in a horizontal plane in any location within a designated work area.

Two corner retro-reflectors 260,264 are fixedly mounted to the lower portion of the moving platform 234 adjacent the mid portion of a back of the platform and are arranged to receive a scanning laser beam just as is described in connection with corner reflectors 160,162 and 164 of the multi-spindle drilling machine of FIGS. 7 and 8. Positions of the moving corner retro-reflectors with respect to the fixed tabletop or elements fixed thereto are measured by scanning laser systems that are substantially identical to the laser measuring systems described above.

For measuring the distance to corner cube 260 a scanning mirror assembly 266 is mounted adjacent the rear pivot point of lead screw 244 to receive a light beam from a laser/receiver 268 for reflection in an oscillating scanning pattern (centered on a line 270) over a work area that includes corner reflector 260. The scanning mirror assembly and its control are the same as the mirror assembly and control described above. In the arrangement of FIGS. 10 and 11, instead of using a separate laser and a separate receiver, a single combined laser and receiver unit is used for each of the scanning mirrors. In an exemplary embodiment, the laser receiver is an Optodyne L-101. The display is an Optodyne D-101 and the control box is an Optodyne P-201 control and power box. A beam is sent from the laser to the scanning mirror and reflected from the scanning mirror along a sweeping optical path 270 to the corner reflector 260, which, when illuminated by the beam, retro-reflects the beam back to the mirror and thence to the receiver of the laser/receiver. The scanning mirror assembly 266 includes structure that is the same as that described in connection with the laser position measuring system of FIGS. 7 and 8, which will slow the rapid sweep and then switch the mirror control from the scanning sweep to a fine positioning control. The system also controls the mirror angle so as to direct the beam precisely to the optical center of the corner reflector, as previously described. The laser/receiver includes an interferometer that provides a precise measurement of the distance from the axis of rotation of scanning mirror assembly 266 to the optical center of the corner cube 260.

Position of the second corner cube 264 is measured by an identical system, including a laser/receiver 270 sending a beam to a scanning mirror assembly 272 mounted on a mirror base assembly 274, and sending an oscillating scanning beam along an optical path 276 to the corner reflector 264, which retro-reflects the beam back to the scanning mirror and thence back to the laser/receiver 270 and its built-in interferometer.

The described pick and place machine provides a moving platform 234 that moves in a single plane parallel to the upper surface of tabletop 200 with a capability of extremely accurate positioning of the center of rotation 280 of mechanical hand 240. The apparatus also allows for very high speed motion, up to as much as 60 inches per second. Positioning accuracy within one hundred millionths of an inch is accomplished by the laser measurement of distance between rotating mirror centers and optical centers of the corner cubes. Positions of the corner cubes, on the platform 234, with respect to the center of rotation of the mechanical hand, also on the platform 234, are known and fixed, and the distances between the axis of rotation of outer tube 204 and the axes of rotation of each of the oscillating mirrors are fixed and known. Thus, by continuously measuring the two variable distances between the scanning mirror centers and optical centers of the corner cubes, triangulation is readily carried out for calculation of the position of the axis of the mechanical hand as the platform moves back and forth along the rods and the rod and platform assembly swings from side to side about the center of rotation of outer tube 208.

The use of a triangular arrangement of positioning structure, namely a triangle having a fixed base between the rear pivot points of the lead screws and two movable arms (the lead screws) pivoted to the platform, provides great stiffness to the moving structure and enables a high dynamic performance, particularly for motion in directions parallel to the guide rods.

The arrangement of FIGS. 10 and 11 may be employed as a measuring probe merely by replacing the mechanical hand with a position sensing probe, moving the probe to a point of which position is to be measured, and measuring the positions of the two corner reflectors.

There have been described methods and apparatus for precisely measuring positions of a movable machine tool using a scanning laser system that locks on to a moving retro-reflector and measures distance to the retro-reflector from the center of a scanning sweep.

I claim:

1. Apparatus for measuring position of a tool comprising:
   a fixed support,
   a tool support member movably mounted on said support,
   means for driving the tool support member relative to the support to a plurality of positions within a predetermined work area,
   a plurality of mutually spaced retro-reflectors mounted on said tool support member,
   a plurality of energy beam scanning devices mounted on said fixed support, each said scanning device including means for projecting an energy beam from a fixed reference position on said fixed support in a scanning sweep through a target area that includes positions of one of said retro-reflectors as said tool support member is driven within said work area, and
   means including said scanning devices for measuring the distance from each said scanning device to one of said retro-reflectors.

2. The apparatus of claim 1 wherein at least one of said scanning devices includes a mirror mounted for rotation about an axis, and means for oscillating said mirror about said axis.

3. The apparatus of claim 1 wherein at least one of said scanning devices includes a sweep motor, sweep generating circuit means for generating a sweep signal, fine positioning means for generating a fine positioning signal, and means for alternatively feeding said sweep signal and said fine positioning signal to said sweep motor.

4. The apparatus of claim 1 wherein one of said scanning devices comprises a rotatably mounted mirror, a sweep motor connected to oscillate said mirror, a laser for generating one of said energy beams, and optical path control means for directing said one energy beam along an optical path from said laser to said mirror for reflection to said retro-reflector.

5. The apparatus of claim 4 wherein said one scanning device includes an interferometer interposed in the optical path between said laser and said scanning mirror, and a receiver connected to receive an output from the interferometer, said interferometer providing an output to said receiver representing distance measured.

6. The apparatus of claim 5 wherein said receiver is displaced from the path of the laser beam between said laser and said interferometer, and wherein one of said retro-reflectors includes means for transversely displacing a beam retro-reflected therefrom along a path to said receiver.

7. The apparatus of claim 4 wherein said one scanning device includes first and second light responsive cells positioned to receive light reflected from said retro-reflector, means responsive to light received by one of said cells but not the other for decreasing the rate of oscillation of said mirror.

8. The apparatus of claim 4 wherein said one scanning device includes first and second closely positioned, mutually spaced photosensitive cells both positioned to receive equal amounts of light when the laser beam projected by the scanning mirror is precisely directed at one of the retro-reflectors, means responsive to both of said photo sensitive cells for generating a fine position signal indicative of the difference in amounts of light received by the cells, and means responsive to light received by both of said cells for controlling said sweep motor to stop oscillation of said mirror and for applying said fine position signal to said sweep motor.

9. A method of measuring position of a tool carried by a movable tool support member that is driven to a plurality of positions within a predetermined work area, said method comprising:
   mounting a plurality of mutually spaced retro-reflectors on said member,
   projecting a plurality of energy beams from a plurality of fixed positions in a scanning sweep through said work area as said member is driven, and
   employing said energy beams to measure the distances between each said retro-reflector and a respective one of said fixed positions when said tool support member is at one of said plurality of positions.

10. The method of claim 9 wherein said steps of projecting and employing one of said energy beams to measure comprise stopping said scanning sweep when said one energy beam impinges upon one of said retro-reflectors, receiving a reflection of said one energy beam from said one retro-reflector, and employing said received reflection to measure distance to said one retro-reflector.

11. The method of claim 9 wherein said step of stopping comprises generating a fine position signal, and employing said fine position signal to precisely direct one of said energy beams to one of said retro-reflectors.

12. The method of claim 9 wherein said step of projecting energy beams comprises the step of generating a sweep signal, and employing said sweep signal to direct one of said energy beams in said scanning sweep, and wherein said step of employing said one energy beam to measure distance comprises the step of sensing impingement of said one energy beam upon one of said retro-reflectors, stopping employment of said sweep signal to direct said one beam, generating a fine position signal, and employing said fine position signal to control direction of said one energy beam.

13. The method of claim 12 including the steps of detecting initial impingement of said one energy beam on said one retro-reflector, and decreasing speed of said sweep signal upon initial impingement of said one energy beam on said one retro-reflector.

14. A method of measuring position of a tool carried by a movable tool support member that is driven to a plurality of positions within a predetermined work area, said method comprising:
   mounting a retro-reflector on said member,
   projecting an energy beam from a fixed position in a scanning sweep through said work area as said member is driven, and
   employing said energy beam to measure the distance between said retro-reflector and said reference position when said tool support member is at one of said positions,
   said step of mounting a retro-reflector comprising mounting three retro-reflectors at predetermined positions on said movable tool support member, said step of projecting an energy beam comprising projecting three separate energy beams from three separate fixed reference positions in three separate scanning sweeps through the target areas that include respective ones of said retro-reflectors as said member is driven within said work area, and wherein said step of employing said energy beam to measure distance comprises the step of employing each of said three energy beams to measure the distance from respective ones of said retro-reflectors to respective ones of said fixed reference positions.

15. Apparatus for measuring position of a tool comprising:
a support,
a tool support member movably mounted on said support,
means for driving the tool support member relative to the support to a plurality of positions within a predetermined work area,
a plurality of retro-reflectors mounted on said member at known mutually spaced positions,
a plurality of energy beam scanning devices mounted on said fixed support, each said scanning device including means for projecting an energy beam from a fixed reference position on said scanning support in a scanning sweep through a target area that includes an individual one of said retro-reflector positions as said member is driven within said work area, and
means in each said scanning device for measuring the distance from such scanning device to an individual one of said retro-reflectors.

16. The apparatus of claim 15 wherein said means for driving the tool support member comprises a plurality of extensible elongated actuators connected between mutually spaced points on said support and mutually spaced points on said tool support member.

17. The apparatus of claim 16 wherein said support comprises a table having a flat surface, and wherein said tool support member is mounted for omni-directional unguided motion on said support.

18. The apparatus of claim 17 wherein said support includes a second table fixedly mounted above and behind said first mentioned table, said tool support member having forward, rear and intermediate sections and a plurality of lower low friction shoes on said intermediate section slidably bearing on said flat surface, said tool support member having an upper low friction shoe on said rear portion slidably bearing on said second table, and a tool carrying member on said forward portion.

19. The apparatus of claim 18 wherein each of said scanning devices includes a sweep motor, sweep generating circuit means for generating a sweep signal, fine positioning means for generating a fine positioning signal, and means for alternatively feeding said sweep signal and said fine positioning signal to sweep motor.

20. The apparatus of claim 18 wherein each said scanning device comprises a rotatably mounted mirror, a sweep motor connected to oscillate said mirror, a laser, and optical path control means for directing the beam from said laser to said mirror for reflection to an individual one of said retro-reflectors.

21. The apparatus of claim 16 wherein said support comprises a base, said tool support member comprising a pair of guide rods rotatably mounted on said base, and a tool carrying platform slidably mounted on said guide rods.

22. The apparatus of claim 20 wherein each of said scanning devices includes first and second closely positioned, mutually spaced photosensitive cells both positioned to receive equal amounts of light when the beam projected by the associated scanning mirror is precisely directed at the associated retro-reflector, means responsive to both of said photo sensitive cells for generating a fine position signal indicative of the difference in amounts of light received by the cells, and means responsive to light received by both of said cells for controlling said sweep motor to stop oscillation of said mirror and for applying said fine position signal to said sweep motor.

23. Position measuring apparatus for a machine tool having a tool support member movably mounted for travel over a fixed support through a predetermined work area, said positioning apparatus comprising:
first, second and third retro-reflectors mounted on said tool support member in predetermined fixed positions relative to said member,
first distance measuring means for measuring a first distance to said first retro-reflector, said first measuring means comprising:
a first scanning sweep mirror mounted at a first known reference position on said fixed support,
a first motor connected to drive said mirror through an angular oscillation sweep,
means for projecting a first laser beam along a first optical path to said first mirror,
a first interferometer mounted in said first optical path for transmitting said first laser beam to said first mirror and for receiving reflected light from said first mirror,
a first sweep control circuit for controlling said first motor to control said first mirror, and
a first receiver responsive to an output of said first interferometer for providing an output signal indicative of the distance between said first mirror and said first retro-reflector,
second distance measuring means for measuring a second distance to said second retro-reflector, said second distance measuring means comprising:
a second scanning sweep mirror mounted at a second known reference position on said fixed support,
a second motor connected to drive said second mirror through a second angular oscillation sweep,
means for projecting a second laser beam along a second optical path to said second mirror,
a second interferometer mounted in said second optical path for transmitting said second laser beam to said second mirror and for receiving reflected light from said second mirror,
a second sweep control circuit for controlling said second motor to control said second mirror, and
a second receiver responsive to an output of said second interferometer for providing an output signal indicative of the distance between said second mirror and said second retro-reflector, and
third distance measuring means for measuring a third distance to said third retro-reflector, said third distance measuring means comprising:
a third scanning sweep mirror mounted at a third known reference position on said fixed support,
a third motor connected to drive said third mirror through a third angular oscillating sweep, means for projecting a third laser beam along a third optical path to said third mirror,
a third interferometer mounted in said third optical path for transmitting said third laser beam to said third mirror and for receiving reflected light from said third mirror,
a third sweep control circuit for controlling said third motor to control said third mirror, and
a third receiver responsive to an output of said third interferometer for providing an output signal indicative of the distance between said third mirror and said third retro-reflector.

24. The apparatus of claim 23 wherein said tool support member comprises a rigid structure having forward, intermediate and rear sections, a tool holding assembly carried by said tool support member at said forward section, said fixed support comprising a table having a flat surface, a plurality of low friction shoes carried by said rigid structure at said intermediate section and slidably bearing on said flat surface to support said rigid structure for omni-directional motion, slidable means for supporting said rear section of said rigid structure, and a plurality of elongated extensible actuators connected between said fixed support and said rigid structure.

25. The apparatus of claim 24 wherein said actuators comprise first and second actuators that are substantially parallel to each other, and a third actuator extending transversely of said first and second actuators.

26. The apparatus of claim 24 wherein said fixed support includes an upper table having a flat surface and fixedly mounted at the rear of and above said first mentioned table, and an upper low friction shoe carried by said rigid structure at said rear section and slidably bearing on said upper table.

27. Tool positioning apparatus for positioning a tool in a positioning plane comprising:
a tool support table having a flat surface parallel to said positioning plane,
a tool carriage that is unguided in said plane,
means for exerting first and second forces in mutually opposite directions on said carriage and at an angle to said plane for movably supporting said carriage on said surface for unguided motion over said table,
means on said carriage for carrying a tool, and
drive means for driving said carriage over said flat surface to a controlled position and orientation, said drive means comprising three extensible actuators connected between said carriage and said support table.

28. The tool positioning apparatus of claim 27 wherein said tool support table comprises a first section having an upwardly facing flat surface and a second section having a downwardly facing flat surface, said means for movably supporting said carriage comprising a first low friction device on said carriage in contact with said upwardly facing surface and a second low friction device on said carriage in contact with said downwardly facing surface.

29. The tool positioning apparatus of claim 28 wherein said tool carriage comprises forward, rear and intermediate sections, said means for carrying a tool being mounted on said forward section, said first low friction device being mounted on said intermediate section, whereby weight of said forward section exerts a turning moment tending to urge said forward section downwardly, and wherein said second low friction device is mounted on said rear section and exerts force on said downwardly facing flat surface that tends to counter said turning moment exerted by said forward section.

30. The tool positioning apparatus of claim 27 including means for measuring distance between a point on said carriage and a point fixed with respect to said tool support table, said measuring means comprising a corner reflector fixedly positioned on said carriage, a light beam scanning device mounted for rotation about an axis at a fixed position relative to said tool support table and constructed and arranged to project a light beam in a scanning sweep through a work area including said corner reflector, optical means for measuring the distance between said scanning device and said corner reflector, and sweep position control means for controlling rotational position of said scanning device.

31. The tool positioning apparatus of claim 30 wherein said sweep position control means comprises a motor connected to rotate said scanning device, sweep generator means for generating a sweep signal, photosensitive means on said fixed support configured and arranged to receive light reflected from said corner reflector to said scanning device and from said scanning device to said photosensitive means, means responsive to reception of light by said photosensitive means for generating a position control signal, and means responsive to said photosensitive means for alternatively applying said sweep signal or said position control signal to said motor, to cause said scanning device to move in a scanning sweep on application of said sweep signal, or to cause said scanning device to center a retro-reflected light beam on application of said position control signal.

32. The tool positioning apparatus of claim 31 wherein said scanning device comprises a base, a rotor rotatably mounted on said base and having an axis, a mirror mounted on said rotor, a light source on said base, a light sensitive device on said base and spaced from said light source in the direction of the axis of said rotor, and a light obstructing cam on said rotor and interposed between said light source and said light sensitive device.

33. Tool positioning apparatus for positioning a tool in a plane comprising:
a tool support table,
a guide structure extending parallel to and spaced from said tool support table,
means for mounting said guide structure to said tool support table for rotation about an axis perpendicular to said tool support table,
a platform mounted on said guide structure for motion along the guide structure,
means for rotating said guide structure and driving said platform along said guide structure, and
means for measuring distance from first and second points fixed with respect to one another and with respect to said tool support table and each of third and fourth points fixed with respect to said platform.

34. The tool positioning apparatus of claim 33 wherein said means for rotating said guide structure and driving said platform comprises a first extensible actuator having an inner end pivoted to said tool support table and an outer end pivoted to said platform, a second extensible actuator extending at an angle to said first mentioned actuator and having an inner end pivoted to said tool support table structure and an outer end pivoted to said platform, and means for driving said first and second actuators.

35. The tool positioning apparatus of claim 33 wherein said means for measuring includes first and second mutually spaced corner reflectors fixedly positioned on said platform, first and second light beam scanning devices mounted for rotation about axes at fixed positions relative to said tool support table and constructed and arranged to project first and second light beams in scanning sweeps through work areas including said corner reflectors, and optical means for measuring the distances between said scanning devices and said corner reflectors.

36. The tool positioning apparatus of claim 35 including sweep position control means for controlling rotational position of one of said scanning devices, said sweep position control means comprising a motor connected to rotate said one scanning device, sweep generator means for generating a sweep signal, photosensitive means on said fixed support configured and arranged to receive light reflected from one of said corner reflectors to said one scanning device and from said one scanning device to said photosensitive means, means responsive to reception of light by said photosensitive means for generating a position control signal, and means responsive to said photosensitive means for alternatively applying said sweep signal or said one position control signal to said motor to cause said one scanning device to move in a scanning sweep on application of said sweep signal, or to cause said one scanning device to center a retro-reflected light beam on application of said position control signal.

37. The tool positioning apparatus of claim 36 wherein said one scanning device comprises a base, a rotor rotatably mounted on said base and having an axis, a mirror mounted on said rotor, a light source on said base, a light sensitive device on said base and spaced from said light source in the direction of the axis of said rotor, a light obstructing cam on said rotor and interposed between said light source and said light sensitive device.

* * * * *